(12) United States Patent
Van Schoiack

(10) Patent No.: US 8,631,893 B2
(45) Date of Patent: Jan. 21, 2014

(54) DRIVER DROWSINESS DETECTION AND VERIFICATION SYSTEM AND METHOD

(76) Inventor: Michael M. Van Schoiack, Bellevue, WA (US)

( * ) Notice: Subject to any disclaimer, the term of this patent is extended or adjusted under 35 U.S.C. 154(b) by 328 days.

(21) Appl. No.: 12/945,747

(22) Filed: Nov. 12, 2010

(65) Prior Publication Data

US 2011/0284304 A1 Nov. 24, 2011

Related U.S. Application Data

(60) Provisional application No. 61/261,485, filed on Nov. 16, 2009.

(51) Int. Cl.
*B60K 28/02* (2006.01)

(52) U.S. Cl.
USPC .......................................... 180/272; 340/576

(58) Field of Classification Search
USPC .............. 180/272; 340/576; 280/731, 735
See application file for complete search history.

(56) References Cited

U.S. PATENT DOCUMENTS

| | | | | |
|---|---|---|---|---|
| 3,222,639 A | * | 12/1965 | Kayser, Jr. | 340/576 |
| 3,585,626 A | * | 6/1971 | Tartarini | 180/272 |
| 4,210,905 A | * | 7/1980 | Coons | 340/575 |
| 6,045,156 A | * | 4/2000 | Spell et al. | 280/735 |
| 6,081,044 A | * | 6/2000 | Anthofer et al. | 307/10.1 |
| 6,590,499 B1 | * | 7/2003 | D'Agosto | 340/575 |
| 6,859,143 B2 | * | 2/2005 | Braeuchle et al. | 340/576 |
| 7,664,609 B2 | * | 2/2010 | Adam et al. | 702/47 |
| 7,821,506 B2 | * | 10/2010 | Sato et al. | 345/174 |
| 8,013,747 B2 | * | 9/2011 | Chen | 340/576 |
| 2008/0252466 A1 | * | 10/2008 | Yopp et al. | 340/576 |

* cited by examiner

*Primary Examiner* — Paul N Dickson
*Assistant Examiner* — Timothy Wilhelm
(74) *Attorney, Agent, or Firm* — Lowe Graham Jones PLLC

(57) ABSTRACT

A method and steering wheel for determining and verifying a state of driver alertness includes receiving a response at a steering wheel. The method includes selectively energizing at least one stimulus annunciator in the wheel in order to present a first stimulus to a driver. A processor in the wheel generates a signal indicative of a stimulus annunciator onset time indicating the moment the stimulus annunciator provided the first stimulus to the driver. A sensor array arranged on the wheel responds to a first grip pressure the driver exerts at a first grip location on the wheel. The processor generates a response signal indicative of a response onset time. The processor calculates a time interval between the stimulus annunciator onset time and the response onset time.

17 Claims, 3 Drawing Sheets

DRIVER DROWSINESS DETECTION AND VERIFICATION SYSTEM AND METHOD

PRIORITY CLAIM

This application claims priority to U.S. Provisional Patent Application No. 61/261,485 filed on Nov. 16, 2009, and wherein its subject matter is incorporated herein by reference in its entirety.

FIELD OF THE INVENTION

The present invention relates generally to motor vehicle safety equipment and, more specifically, to the driver/motor vehicle interface.

BACKGROUND OF THE INVENTION

The National Highway Transportation Safety Administration (NHTSA), Federal Motor Carrier Safety Administration (FMCSA), the American Truck Association (ATA), safety advocates, and transportation researchers have all identified driver fatigue as a high priority commercial motor vehicle (CMV) safety issue, just as it proves to be in the use of personal transportation. Driver fatigue manifests itself in drowsiness, a state of diminished mental alertness, in turn impairing an individual's ability to operate a vehicle safely and, thereby, increasing the risk of human error that could lead to fatalities and injuries.

Drowsiness is the body's reaction to fatigue and drowsiness slows reaction time, decreases awareness, and impairs judgment. Such studies as have been done show that drivers tend to underreport drowsiness, either because they are not aware of being drowsy or underestimate the extent to which they are impaired by drowsiness. Incidence of impairing drowsiness is underestimated because it is so difficult to quantify and measure.

Anecdotally, most drivers are aware of the existence but not of the extent of the impairing effects of drowsiness on their driving. Obtaining, however, reliable data on fatigue-related crashes is challenging. Good numbers on how many collisions are caused by drowsiness are difficult to ascertain, but are felt to be a significant contributor to the number of crashes. Thus, the science of determining root causes is robbed of its most significant tool, direct observation of cause and effect. For instance, if a motorist is unharmed in a crash, the increased arousal following the incident usually masks the impairment that could assist investigating officers in attributing the crash to drowsiness. As a result, while drowsiness may well be a contributing factor in many motor vehicle crashes, it is underreported in databases that contain police accident reports.

An investigator may report that a crash was caused by a driver running a red light, whereas the real cause of the crash lies upstream, in that the driver was not appropriately vigilant to notice the redness of the light, due to his or her state of drowsiness and fatigue. There exists no currently uniform method of testing for drowsiness across significant populations of drivers.

Vehicle-based operator alertness or, conversely, drowsiness monitoring technologies exemplify the most common approaches currently used to monitor driver fatigue. Generally such technologies are enabled by monitoring one or another operator behavior or physiological attributes such as eye gaze, eye closure, pupil occlusion, head position and movement, brain wave activity, heart rate, and other such measurable physiological attributes. Again, however, because the use of any specific test is not widely available, there have not been tests which determine the specific metrics of any of these attributes as a bellwether of drowsiness likely to lead to a collision. Only when there exist a significant number of such installations can overarching data be developed. There are other problems, as well, with existing drowsiness detection systems for vehicles:

- Available drowsiness detection systems do not work well in all driving conditions.
- Available drowsiness detection systems suffer from the problem of false positives and false negatives. A large percentage of test reports on drowsiness sensors are devoted to assessing when the driver was actually drowsy. The reality is that presently available drowsiness detection systems cannot be totally certain if a driver is drowsy or alert.
- Conventional technologies currently used for drowsiness detection are prohibitively expensive, affirmatively preventing widespread adoption.
- Drivers do not like to have additional devices to interact with or to be distracted from the task of driving, especially during times of high stress. In addition to driver irritation, any additional task that require hand movement away from the task of steering or eye movement away from the roadway is a safety issue.

Existing drowsiness sensors are prone to false positive and false negative warning thresholds. False positive and false negative warnings also means triggers of unnecessary alarms or alertness measures in response to those warnings which imparts uncertainty and suggests to drivers that the sensors are unnecessary at best and, more likely, annoying. Before definitive action to direct the driver's attention to the driving task or even before meaningful statistics can be garnered, knowing if the driver is truly drowsy is necessary. For this reason, verification of sensed drowsiness is a necessary attribute of any such system of detection and accident prevention.

To date, there has been no system that suitably both measures and correlates physiological attributes across large segments of the population, and, then, verifies the presence of those attributes as reflecting actual drowsiness and its attendant impairment. There is no system that is sufficiently efficacious and also inexpensive enough to become a candidate for widespread implementation and study. What is needed in the art is a method and an apparatus for reliable detection of attributes of drowsiness-based impairment and then verification of impairment based upon the actual state of drowsiness after detection.

SUMMARY

A method and steering wheel for determining and verifying a state of driver alertness includes receiving a response at a steering wheel. The method includes selectively energizing at least one stimulus annunciator in the wheel in order to present a first stimulus to a driver. A processor in the wheel generates a signal indicative of a stimulus annunciator onset time indicating the moment the stimulus annunciator provided the first stimulus to the driver. A sensor array arranged on the wheel responds to a first grip pressure the driver exerts at a first grip location on the wheel. The processor generates a response signal indicative of a response onset time. The processor calculates a time interval between the stimulus annunciator onset time and the response onset time.

BRIEF DESCRIPTION OF THE DRAWINGS

Preferred and alternate embodiments of the present invention are described in detail below with reference to the following drawings.

DETAILED DESCRIPTION

The present invention relates generally to motor vehicle safety equipment and, more specifically, to the driver/motor vehicle interface. Many specific details of certain embodiments of the invention are set forth in the following description and in FIGS. 1, 2, and 3 to provide a thorough understanding of such embodiments. One skilled in the art, however, will understand that the present invention may have additional embodiments, or that the present invention may be practiced without several of the details described in the following description.

When broken down into its simplest elements, the ability of an individual to respond to stimuli can be most readily measured by presenting a simple stimulus and measuring the reaction time necessary to make an affirmative and uncomplicated response to that stimulus. In a laboratory setting, where the repeated testing of a subject can be performed without distracting a subject from the driving task, one system has gained almost universal acceptance as a means for studying task attentiveness. Ambulatory Monitoring, Inc. (Ardsley, N.Y.) produces the PVT-192 for such testing (The PVT-192 is housed in a plastic case having a four-digit light-emitting diode (LED) display and two push-button response keys. The LED display is used as the visual stimulus and the subject activates buttons accordingly to give measurable performance feedback.) The literature has shown that simple reaction time is a convenient and sensitive continuous performance test for long-term, large scale testing of awareness, effects of sleep deprivation, and drug effects. The PVT test, combined with easy-to-use React software, has proven to be a valuable tool wherever measures of performance or drowsiness are needed. These include the transportation and pharmaceutical industries (E.g. http://www.unisanet.unisa.edu.au/staff/matthewthomas/GREG/loh(2004) BRMIC.pdf).

During driving, however, to administer a PVT is to distract the driver from the necessary tasks of observation during driving. Clearly, a dash mounted PVT would be a threat to safe driving Nonetheless, the principles of providing a stimulus requiring a simple and readily measured response might suitably be used for verification of drowsiness rather than for its detection. Naturally, however, the verification must be designed to be unobtrusive, itself, in nature so that testing does not dominate the attention of the driver. The criterion for evaluating any system is to assure that the system, itself, does not distract the driver's visual or audio attention, nor that the verification system require the driver to use his or her limbs for anything other than responding to the environmental issue the driving task presents.

Figure 1:
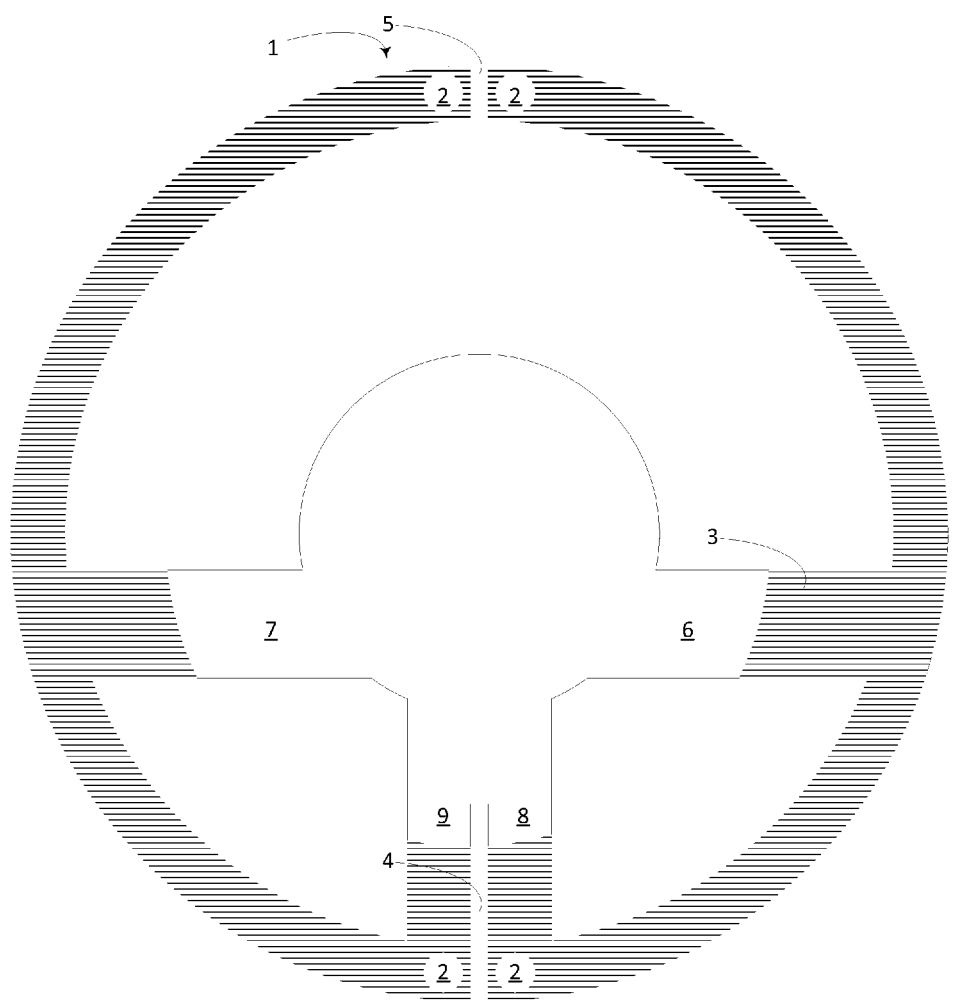
FIG. 1 is a face view of an inventive steering wheel with the preferred embodiment components of the steering wheel drowsiness and verification system installed.
Figure 2:
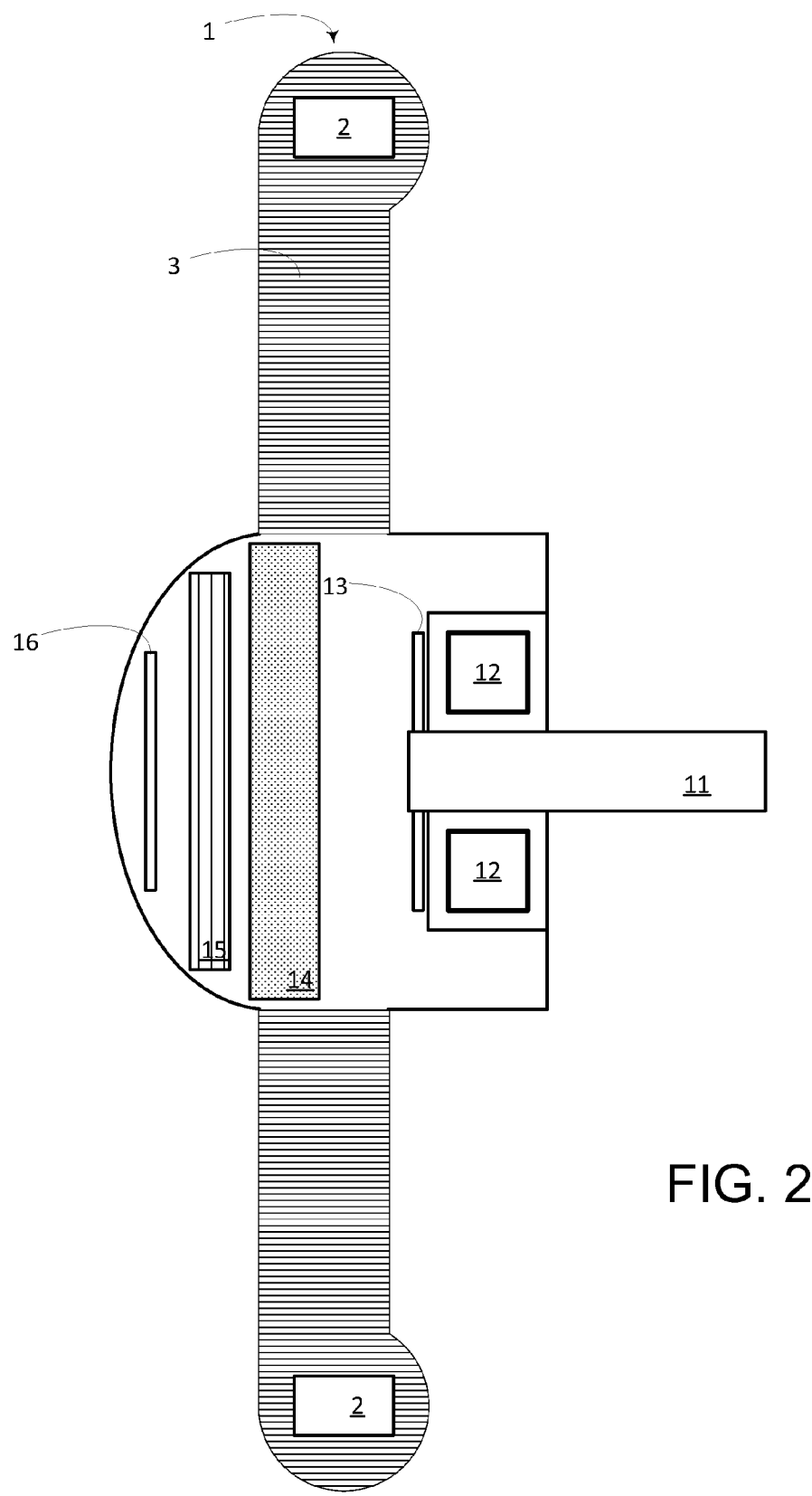
FIG. 2 is a cross-section view of the inventive steering wheel with the preferred embodiment components of the steering wheel drowsiness and verification system installed.

An inventive steering wheel provides an interface for measuring and verifying drowsiness in driver is shown in FIGS. 1 and 2. FIG. 1 is a plan view depicting a steering wheel 1 having sensors 3 and vibrating solenoids embedded within support arms 6 and 7 to impart feedback to a driver. The steering wheel 1 further differs from a conventional steering wheel by defining a resonance slot 4 between a first and second central support arm as well as a decoupling break 5 configured to "tune" the steering wheel to optimize vibration at a selected resonant frequency consistent with a frequency of vibration within the solenoids in the arms 6, 7 when activated. At these frequencies, even small periodic driving forces can produce large amplitude oscillations, because the system stores vibrational energy. As a result, the steering wheel will suitably vibrate much as it might when driving over rumble strips such as are used to demark lane boundaries on well-engineered roadways. In this manner, the warning nature of the vibration is very highly intuitive in nature.

Much as the PVT-192 exploits two push buttons to draw a response from a subject, the inventive steering wheel 1 includes the two sides of the wheel are arranged to have two distinctly arranged sensor arrays 3 such that at the traditional "ten and two" positions for the hands of a driver, the driver can easily activate the response mechanism by selectively squeezing the steering wheel beneath either of the right or left hands in response to the stimulus presented in the stimulus annunciators 2 at convenient positions around the wheel 1. In various embodiments of the inventive wheel, the array 3 extends along an entire surface of the wheel 1. Knowing the position of the wheel (generally such that the slot 4 is at the bottom of the wheel as shown in FIG. 1), processors using simple algorithms could readily determine which of the driver's two hands is imparting a responsive pressure, based upon a stimulus at one or more of the stimulus annunciators 2. Unlike the PVT-192, in interaction with the steering wheel which is the principal interface between the driver and the automobile, the processor's act of testing does not cause the driver to remove the driver's gaze from the roadway nor to remove their hands from the wheel.

The practice of the invention does not require a specific definition for the selective operation of the stimulus annunciator 2. In any situation where the attentive state of the driver is to be tested and verified, the cycle of presenting a stimulus at the stimulus annunciator 2 and measuring an interval of time between that stimulus and the measured driver response at the sensor array can be initiated whenever such a test is deemed appropriate. Without limiting the invention, the purpose of the invention is to determine and verify a driver's state of drowsiness. Thus, to do so, it is presumed that frequent initiation of the cycle might prove distracting to the driver and might ultimately result in the driver's unwillingness to further participate in the testing.

The stimulus annunciator 2 is so named because of its selection of stimuli. Inventive wheels in accord with the invention include stimulus annunciators 2 that present a stimulus but do so in any one of three manners. A driver might receive an auditory clue from a stimulus annunciator configured as a loudspeaker that produces either a tone or series of tones or a spoken auditory cue that acts as a stimulus. Such a spoken cue might be as simple as "Push the right hand steering spoke to respond to this cue." In alternate embodiments, the stimulus might be a tone to which the driver has been trained to respond by grasping the steering wheel in a particular manner, such as simply squeezing the wheel momentarily on either of the right or left sides.

In another embodiment, the annunciator 2 might be a lamp located on the periphery of the driver's gaze such as on the dashboard that flashes based upon activation of the stimulus annunciator 3 in the wheel. Even lights placed on the wheel as shown in FIG. 1 as stimulus annunciators 2 might be advantageously used to provide a stimulus in concert or separately to signal appropriate responses in the driver to be sensed at the sensor array 3.

Still another embodiment is enabled by the configuration of the wheel. The steering wheel 1 further differs from a conventional steering wheel by defining a resonance slot 4 between a first and second central support arm as well as a decoupling break 5 configured to "tune" the steering wheel to optimize vibration at a selected resonant frequency consistent with a frequency of vibration within the solenoids in the arms 6, 7 when activated. As the wheel is broken into two distinct vibratory regions, and because the solenoids in the arms 6, 7 may be independently activated, the steering wheel can be set in distinct vibratory modes where the principal vibration occurs on either of the left, right, or both sides of the wheel. As such, rather than merely providing a means of focusing the driver's attention on the steering task by vibrating when because of slowed response times, a state of drowsiness is sensed, the halves of the wheel might be set to vibrate to provide the stimulus to which the driver responds by grasping the sensor array at a grip strength and a grip location.

Because the sensor array 3 includes a number of discrete sensors arrayed to cover the surface of the wheel 1, the wheel suitably provides information to the processor to also provide instantaneous positioning and grip strength information to the processor. (For purposes of explanation here the binary "on/off" types of switches are described but this explanation does not evidence an intent to limit the invention to binary sensors. Indeed, analog sensors such as resistive force sensors are very useful in this embodiment and would directly measure grip strength rather than to do so by implication as in the explanation that follows.) For example the sensor array 3 could comprise a plurality of membrane switches arrayed to cover the surface of the steering wheel 1 and uniquely addressed such that patterns of activation correspond with position and grip strength with which the driver would be gripping during driving. This effect is further exploited if the membrane switches are selected with a plurality of activation biases to distinctly show grips of differing strengths at identical positions on the wheel.

Thus, as in the use of wheel in a drowsiness detection system, the driver would selectively increase his or her grip, or push on the steering wheel, in response to a stimulus at one or more of the stimulus annunciators 2. Such a pressure would close series of membrane switches in the array 3 in one embodiment of the array 3. The effect is heightened where a subset of the switches in the array are selected such that switches would not normally be closed during normal driving such that the driver would have to increase the strength of the grip to respond.

The array 3, optionally, includes switches that are suitably activated upon little more pressure than mere contact, the distinct switches within the array 3 will also provide continuous information as to instantaneous grip positions. When used in concert where activation pressures vary in a known manner, the grip strength can be measured as a function of the number of switches beneath the known grip position on the wheel 1. Thus, the inventive wheel senses grip strength information based upon the pressure that the driver imparts and switch activation patterns are then gainfully used to inform the processor as to whether, in a moment of inattention, the driver has released partially or wholly his or her grip on the wheel 1. In such an embodiment, the wheel 1 is duly tasked both as a response mechanism to specific stimuli and also as a monitoring device to detect diminution of attention reflected in diminution of grip strength on the wheel 1.

Another embodiment of the wheel 1, the array 3 includes input devices such as those having capacitive "Touch Sensing" technology as is taught in U.S. Pat. No. 7,821,506 issued to Sato et al. on Oct. 26, 2010 and its references. By exploiting such technologies, position and grip strength are readily provided to the processor. The addition of resistive force sensors might be advantageously used in the array 3 to determine grip strength. There are also a number of flexible, pressure sensitive resistive, capacitive and piezoelectric films that can be used as the touch sensing element of the sensor array 3 covering the surface of the wheel 1. Embodiments of the touch sensors that might be used in such an array also include membrane switches, capacitive switches, resistive force sensors, piezoresistive strain gages, piezoelectric sensors; ampule type pressure sensing switches, inductance sensors, optical sensors, and potentiometric sensors.

The several sensing means herein described, as well as equivalent means for touch sensing can be selected as research and engineering decisions reveal advantages and disadvantages of each such that a sensing array 3 can be suitable, not only to receive a response to a selected stimulus, but also to collect more complex pressure or presence information. Suitable selection of sensing means would disclose additional driver behavior and habits. The identification of such habits will lend further definition to an algorithm for detection of drowsiness, either as applied to the general population or, in conjunction with an artificially intelligent processor, might yield individually meaningful indicia reflective of drowsy or inattentive driving.

To further explain the advantages of a suitably sensored sensor array 3, one can readily imagine a prototypical driver having a series of habits that indicate a descent into inattention, before it happens. "Knee driving" (using the knee instead of hands to steer) might readily be detected if the lower rim of the steering wheel is pressed radially without corresponding pressure on the interior of the rim to indicate prehensile grip on the wheel. The prototypical driver might have a regular regimen including the using of knee driving to rub eyes or simply as one of several awareness maneuvers that precede inattention. After collecting regular recurrent patterns of activation of the sensor array 3 to indicate knee steering, the processor might anticipate drowsiness and might, optionally, monitor not only grip pressure on the sensor array 3 of the wheel 1 but also might activate another sensing system such as a camera to track eye blinks or nods, a lane position sensor to detect weaving, or to activate the stimulus annunciator 2 to require a more definitive response at the wheel 1.

As the principal interface between the driver and the automobile or any processor advantageously located within the automobile, the steering wheel 1 is a useful platform for a drowsiness sensor. Specifically, receiving information at the steering wheel 1 without requiring the affirmative movement of the hands from the steering wheel 1 is specifically selected as the least intrusive on the steering task. The familiarity with the wheel 1 as an interface, also allows interaction without diverting the eyes from the road, furthering the goal of collection of data without intruding on the driving and steering task.

FIG. 2 depicts the same steering wheel 1 in cross section view rather than the plan view of FIG. 1 and shows beneath the horn button 16 and an air bag 15 of an embodiment that includes placement of an electronics module 14 and an included at least one wheel rotational sensor 12 and 13 (working together as unit). The inclusion of the horn button 16 and the air bag 15 for illustrative purposes (not a claimed portion of the invention) are a horn switch 16, an air bag 15 and steering column shaft 11, though nothing in the invention requires the precise location of any of the illustrated elements, whether claimed or unclaimed. The steering wheel 1 is attached to the steering wheel column shaft 11 to effect its principal purpose in the linkage between the driver and the automobile for controlling its direction. Also shown in FIG. 2 are the cross-section of the stimulus annunciator 2 and the sensor array 3 arranged on the steering wheel 1.

In general, a driver makes many incremental changes in course over any Given interval. Drowsy drivers, however, will stop making those incremental changes to direct the automobile within the lane for short intervals and then abruptly and sharply to correct their course. Admittedly, drowsiness is but one reason why a driver might make a sudden lane change; putting on lipstick, trying to use a cell phone, eating or reading while driving are others. Advantageously, however, for each of these a test embodying a stimulus and a response is useful in judging impairment of attention and, the inventive steering wheel and method are useful and the fact that there is no currently known means of distinguishing these responses does not diminish the utility of the invention. For that reason, both of rotational or angular displacement and the first derivative over time, rotational or angular acceleration are both useful for detection of inattention, even if that inattention is not uniquely the result of drowsiness. The inventive wheel 1 optionally includes rotational sensors 12 to further monitor the driver's state of alertness and to provide information for an artificially intelligent algorithm to suitably activate an increased scrutiny of the driver after incidents of abrupt course correction.

Figure 3:
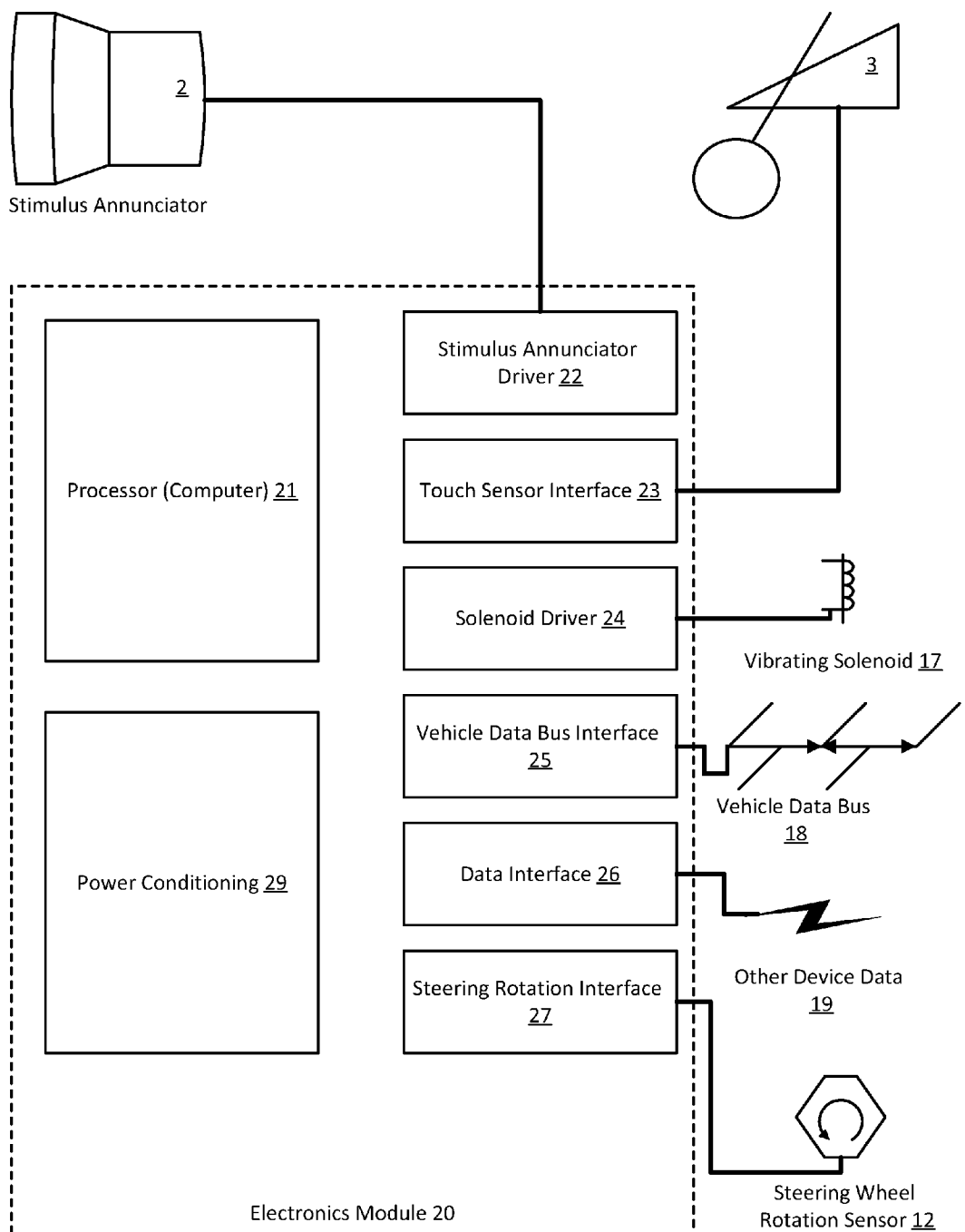
FIG. 3 includes a block diagram of the electronics module in the inventive steering wheel.

FIG. 3 includes a block diagram of an inventive electronics module 20 which, itself, optionally includes a power conditioning section 29 to convert vehicle power to suitably constant voltage as might be advantageous to operate the a processor or computer 21 and the several interfaces the computer 21. In a nonlimiting exemplary embodiment the interfaces include any combination of a touch sensor interface 23, a steering wheel rotation sensor 12, a driver 24 for the selective vibration solenoids 17 (FIG. 1 within steering arms 7, 8), a driver for the stimulus annunciator 2, a vehicle data bus interface 25, and an "other device" data interface 26. (By way of further explanation, the use of the term solenoid is not meant to limit vibration sources to those that strictly fit within the traditional definition of a solenoid as a "a metal core free to slide along the coil axis under the influence of the magnetic field" but any transducer capable of imparting vibratory kinetic energy to the system such as a motor driving an out of balance flywheel or other such mechanical oscillators.) By operative connection, the computer either, in the case of a driver, triggers operation and defines the mode of operation for a first broad class of transducers or, in the case of an interface, receives data from a second broad class of transducers or ports.

Each driver or interface, then is suitably configured enable the computer 21 to interact with its selected transducers. Thus, the stimulus annunciator driver 22 drives a signal to the stimulus annunciator 2 to allow the presentation of a stimulus to the driver to initiate the measurement of response time and accuracy. Similarly, the touch sensor interface allows the computer 21 to receive signals from the sensor array 3 and to receive those signals in a manner to identify the source of each signal as an addressable element in the sensor array 3. The solenoid driver 24 activates the vibrating solenoids 17 in the steering wheel arms 7, 8 (FIG. 1). In one embodiment, actual vibration of the wheel by the solenoid driver 24 vibrating the solenoids 17 might be a stimulus rather than to be limited to focusing the driver's attention on the driving task by means of vibrating the inventive steering wheel. In such an embodiment, the stimulus annunciator driver 22 to driving a signal to the stimulus annunciator 2 might be redundant in the presence of the solenoid driver 24 vibrating the solenoids 17, and the stimulus annunciator driver 22 and the stimulus annunciator 2 might be omitted without departing from the invention as described herein.

The vehicle data bus interface 25 receives from a vehicle data bus 18 speed, braking, and other relevant data from a vehicle's engine control computer or other such onboard sources such as the OBD II on-board diagnostic system. In one nonlimiting exemplary embodiment, the vehicle data bus interface 25 is receptive to signals from an exemplary vehicle data bus such as CANbus. For purposes of explanation, CANbus is selected as it is a serial communication system that is used on many motor vehicles to connect individual systems and sensors. To the automotive industry, CANbus is an economical and more modern alternative to stringing conventional multi-wire looms each carrying dedicated wires. As it is used in this exemplary discussion, CANbus is an acronym for Controller Area Network.

In most current embodiments of the vehicle data bus 18 operate at a bus speed of 250 KB/s or 500 KB/s, although systems are available operating at up to 1 MHz. The heart of a CANbus is the CAN controller connected to all the several components (Nodes) on an exemplary network that might be connected via the CAN-H and CAN-L wires. The signal is differential, i.e. each of the CAN lines is referenced to the other line, not vehicle ground. This has significant advantages from the point of view of noise rejection when used in electrically noisy environments such as motor vehicles. Each network node has a unique identifier. Since the ECUs on the bus are effectively in parallel, all the nodes see all of the data, all of the time. A node only responds when it detects its own identifier. For example, when the ABS ECU sends the command to activate the ABS unit, it responds accordingly, but the rest of the network will ignore the command. Individual nodes can be removed from the network, without affecting the other nodes. As such, all operative information is available to the Vehicle Data Bus Interface 25 to determine a vehicle state thereby allowing the processor 21 to, at least, further differentiate between characteristic angular movements of the steering wheel 1 appropriate to the vehicle state as detected at vehicle data bus interface 25 and the actual angular movement of the steering wheel the driver imparts.

Several of the data that a Vehicle Data Bus Interface 25 such as that described herein are capable of receiving from the Vehicle Data Bus 18 are:
  a. Vehicle state including: the speed, engine revolutions, "key on" condition (The system should not be attempting to stimulate the driver when the driver is starting the vehicle for example.);
  b. Calibration opportunities inferred from vehicle state, e.g. when to assume when the driver does not have his hands on the steering wheel in order to determine sensor offsets, i.e., calibration;
  c. Driver irregularities such as rapid fluctuations in throttle position, erratic brake application, etc.;
  d. Augmented application, e.g. receiving some indication of drowsiness some other drowsiness sensing system, e.g., PerClos, Lane Tracking as a trigger for conducting the drowsiness test;
  e. In at least one embodiment, the vehicle data bus interface 25 might be advantageously used in an active mode to provide means of alerting the driver to a state of drowsiness (some alert such as flashing gauge lights or cabin lights) or to warn others of the issue by, for example, turning on the hazard lights;
  f. As onboard safety systems evolve, other systems might seek to use the inventive steering wheel's solenoids or stimulus annunciators as warning signals that there is a vehicle in the right/left adjoining lane which, when the driver was turning the vehicle, could determine an unsafe condition existed and warn the driver; and g. When not being used in a stimulus/response mode, the sensing array 3 might be optionally used to activate such auxiliary function such as the horn or turn signals.

In one embodiment, the data interface 26 includes a means for situational awareness. To achieve such awareness, the data interface 26 receives information from such sources as, for example, a Bluetooth™ connection. In the context of commercial vehicle, the data interface 26 might optionally receive a signal indicative of a driver identification so that a distinct record might be retrieved to enable an artificially intelligent processor to specifically anticipate drowsiness based upon already observed patterns the driver is known to exhibit. In a second embodiment, the data interface 26 exploits the connection to transmit and receive data from a distinct location thereby allowing the establishment of a client server relationship over a commercial cellular network. Other embodiments are possible using the data interface to enhance the performance of the steering wheel 1.

While the invention has been described as being suitably used to verify drowsiness after that drowsiness has been detected from external sources such as by monitoring one or another operator behavior or physiological attributes such as eye gaze, eye closure, pupil occlusion, head position and movement, brain wave activity, heart rate, and other such measurable physiological attributes, or by detected wandering motions within the lane, there are several means of using the inventive steering wheel, itself, such as by release of the grip on the steering wheel at the sensor array 3. There is, additionally, the steering wheel rotation sensor 12 which generates signals to the computer 21 to at a steering rotation interface 27. Patterns of angular movement of the wheel 1 that a driver might exhibit in drowsy or inattentive states might be "learned" at the processor 21 and stored on nonvolatile memory the processor 21 comprises. When these are duplicated by the driver, those actions might trigger the drowsiness verification stimulus.

As an exemplary means of operation, the inventive steering wheel 1 including the electronics module 20, might administer a stimulus and measure the timeliness and, in one embodiment, the correctness of the response. The computer 21 senses the need to verify a detected state of drowsiness in a manner similar to the PVT-192 by sending a signal to the stimulus annunciator driver 22 which, in turn, activates one or another of a plurality of stimulus annunciators 2. In response to the activation of the stimulus one or another annunciator 2, the driver imparts a pressure according to the perceived stimulus to the sensor array 3. Upon application of pressure, the sensor array 3 triggers the touch sensor interface in a manner that the driver deems suitable in response to the activation of the stimulus annunciator 2.

While, consistent with mode of the PVT-192, the stimulus annunciator might be used as a visual annunciator such as an LED. In another embodiment of the wheel 1, however, consistent with the objective of minimally invasive stimulation, the wheel 1 itself might be used as a stimulation annunciator. Given the configuration set forth in FIG. 1, the wheel 1 is configured to vibrate in response to a second set of solenoids serving as stimulus annunciators 2 (or alternatively, to dually task the first set of solenoids 17) to stimulate the driver by selectively vibrating sectors of the wheel 1. Should the stimulus annunciator 2 be embodied by a second set of solenoids, a stimulus vibration would be of distinct frequency and mode from the warning vibration the solenoids 17 provide. Should the solenoids 17 be dually tasked, in a preferred embodiment, the amplitude, frequency, or mode of the vibration is selected to be distinct from warning mode. The distinct vibration is enabled by at least amplitude and frequency modulation using pulse width modulation (PWM) techniques known in the art. In addition, more than one solenoid can be used in order to separately vibrate each side of the steering wheel, enabled by the separation of the two halves by the cuts 4 and 5, and to extend the vibration to both sides of the steering wheel support arms 6 and 7.

As described above, the wheel 1 is induced to vibrate at its resonant frequency by activating the solenoids 17 to impart an alert to the driver at selected points where, due to detected drowsiness, the driver's ability to perform the driving task is impaired. Naturally, because the vibration alert is selected to match the natural resonant frequency of the steering wheel 1 to maximize the vibration for effect, it is inherent that the vibration will intrude upon the steering task. Thus, it is only when the driver's ability to perform the steering task is compromised that the intrusion the alert represents is prudently interposed. Where necessary, the activation of the solenoids 17 supplies "jolting" sensation to the driver similar to that imparted to a steering wheel when passing over warning strips known as rumble strips set into pavement surfaces. As stated above, the driver is not required to learn a new response to take advantage of the accident prevention capability of the wheel 1.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A steering wheel system for detecting and verifying drowsiness in a driver, the wheel comprising:
   at least one stimulus annunciator configured to present, upon activation, at least a first stimulus to the driver;
   a sensor array to generate a touch signal to indicate a first grip pressure the driver exerts on the wheel at a first grip location on the wheel; and
   an electronic module including:
      a stimulus annunciator driver to generate a stimulus signal indicative of a stimulus annunciator onset time indicating the moment the stimulus annunciator provided the first stimulus to the driver;
      a touch sensor interface to receive the touch signal from the sensor array and, in response thereto to generate a response signal indicative of a response onset time;
      a processor to determine: a time interval between the stimulus annunciator onset time and the response onset time; and
      a solenoid driver to generate a solenoid signal to selectively cause at least one solenoid to vibrate the steering wheel in response to the solenoid signal, the vibrating of the steering wheel being configured to focus the driver's attention on a steering task, the selective vibration being based upon a magnitude of the interval.

2. The steering wheel system of claim 1, further comprising a vehicle data bus interface, for exchanging signals with a vehicle data bus.

3. The steering wheel system of claim 1, wherein the electronic module further includes a data interface to establish operative communication between a computer and at least one external device.

4. The steering wheel system of claim 1, wherein the at least one stimulus annunciator provides a stimulus selected from the group consisting of vibration, sound or light presented in patterns to elicit a specific response from the driver.

5. The steering wheel system of claim 1, wherein the electronic module further includes a steering wheel rotation sensor to generate a rotation signal indicative of instantaneous angular rotation of the steering wheel.

6. The steering wheel system of claim 5, wherein the processor compares the rotation signal to known patterns of rotation indicative of a state of the driver to be at least one of drowsiness and inattention.

7. The steering wheel system of claim 1, wherein:
the sensor array includes at least a second grip position and the at least one stimulus annunciator includes a second stimulus annunciator configured to, in combination with at least the first stimulus annunciator, to present a stimulus according to a stimulus pattern, the stimulus pattern being configured to elicit a response pattern the driver generates by applying the first grip pressure at one of the first and the second grip positions; and
wherein the processor is configured to receive the response signal, the response signal being further configured to include the response onset time and a signal indicative of the response pattern, and the processor is further configured to determine a correlation between the stimulus pattern and the response pattern.

8. The steering wheel system of claim 1, wherein the sensor array includes sensors selected from a group consisting of membrane switches, capacitive switches, capacitive film sensors, capacitive discrete sensors, resistive force sensors, piezoresistive strain gages, piezoelectric sensors, analog pressure sensing switches, inductance sensors, optical sensors, and potentiometric sensors.

9. A method for determining and verifying a state of driver alertness by receiving a response at a steering wheel, the method comprising:
selectively energizing at least one stimulus annunciator the wheel comprises to present a first stimulus to a driver;
generating a signal indicative of a stimulus annunciator onset time indicating the moment the stimulus annunciator provided the first stimulus to the driver;
receiving, at a sensor array the wheel comprises, a first grip pressure the driver exerts at a first grip location on the wheel;
generating a response signal indicative of a response onset time;
calculating, at a processor, a time interval between the stimulus annunciator onset time and the response onset time; and
based upon the length of the time interval selectively vibrating the wheel to focus the driver on a steering task.

10. The method of claim 9, further comprising: communication, by a vehicle data bus interface, vehicle signals for transmission over a vehicle data bus.

11. The method of claim 9, wherein the selectively energizing at least one stimulus annunciator includes providing a stimulus selected from the group consisting of vibration, sound or light presented in patterns to elicit a specific response from the driver.

12. The method of claim 9, wherein the electronic module further includes a steering wheel rotation sensor sends a rotation signal indicative of instantaneous angular rotation of the steering wheel.

13. The method of claim 12, wherein the processor compares the rotation signal to known patterns of rotation indicative of a state of the driver to be at least one of drowsiness and inattention.

14. The method of claim 9, wherein:
the sensor array includes at least a second grip position and the at least one stimulus annunciator includes a second stimulus annunciator configured to, in combination with at least the first stimulus annunciator, to present a stimulus according to a stimulus pattern, the stimulus pattern being configured to elicit a response pattern the driver generates by applying the first grip pressure at one of the first and the second grip positions; and
wherein the processor is configured to receive the response signal, the response signal being further configured to include the response onset time and a signal indicative of the response pattern, and the processor is further configured to determine a correlation between the stimulus pattern and the response pattern.

15. A method for the study of drowsiness using a stimulus and measuring a response through interaction with a steering wheel, the method comprising:
providing a driver-sensed stimulus from a group of stimuli from a group consisting of lighting a display, generating a sound, or vibrating the steering wheel;
receiving a response from the driver to the stimulus at a sensor array arranged on the steering wheel;
calculating an interval between the steps of providing a driver-sensed stimulus; and
comparing the magnitude of the interval to known values to determine whether the driver is inattentive to a driving task.

16. The method of claim 15, wherein the stimulus is selected from the group consisting of lighting a display; sounding a tone; presenting spoken word cues, and vibration a portion of the steering wheel to elicit a driver response.

17. The method of claim 15, wherein the sensor array includes sensors selected from a group consisting of membrane switches, capacitive switches, resistive force sensors, piezoresistive strain gages, piezoelectric sensors; ampule pressure sensing switches, inductance sensors, optical sensors, and potentiometric sensors.

* * * * *